(No Model.)
G. P. ASKIN.
SHIFTING THILL COUPLING.
No. 354,848. Patented Dec. 21, 1886.
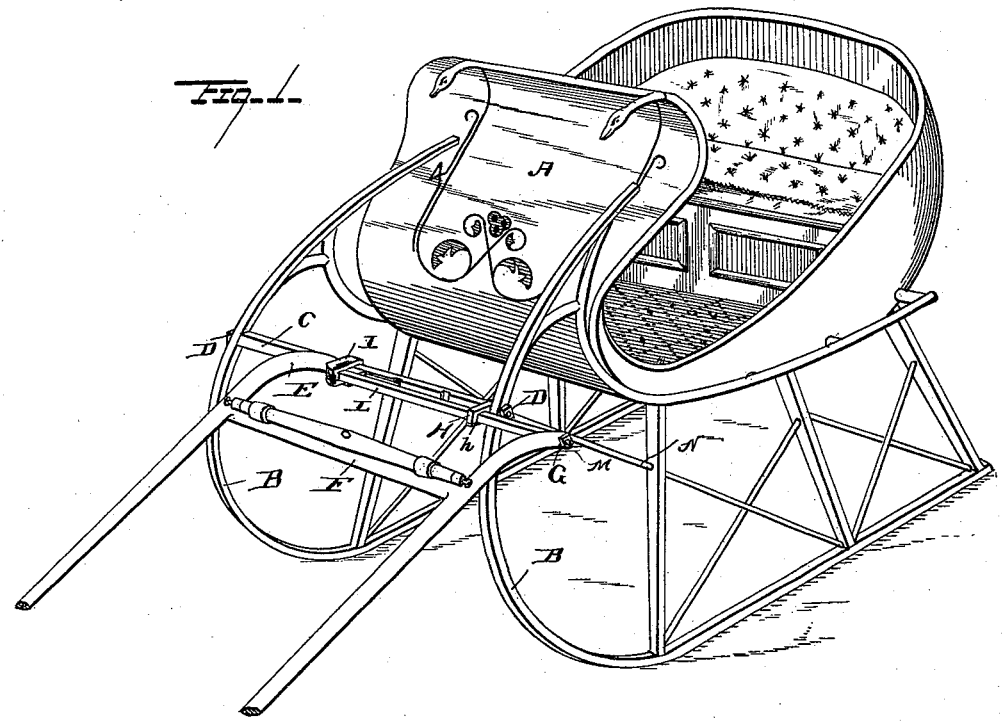
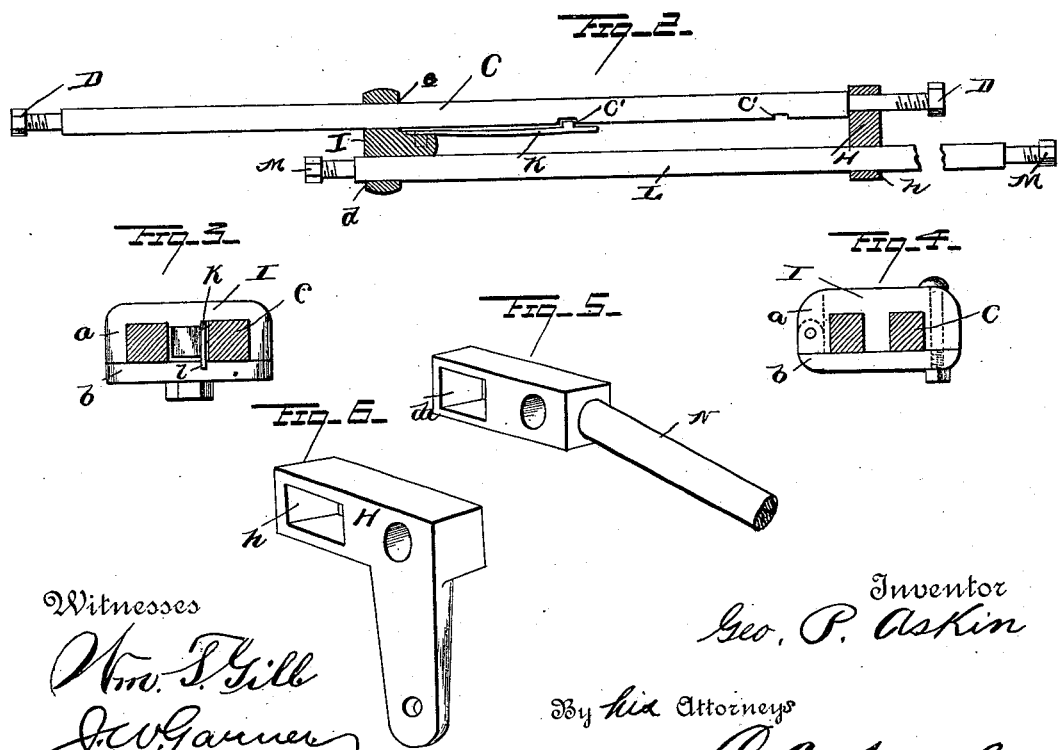
Witnesses
Wm. S. Gill
J. W. Garner
Inventor
Geo. P. Askin
By his Attorneys
C. A. Snowden
N. PETERS, Photo-Lithographer, Washington, D. C.

UNITED STATES PATENT OFFICE.

GEORGE P. ASKIN, OF DETROIT, MICHIGAN, ASSIGNOR TO CHARLES R. WILSON AND JOSEPH C. WILSON, BOTH OF SAME PLACE.

SHIFTING THILL-COUPLING.

SPECIFICATION forming part of Letters Patent No. 354,848, dated December 21, 1886.

Application filed August 10, 1886. Serial No. 210,553. (No model.)

*To all whom it may concern:*

Be it known that I, GEORGE P. ASKIN, a citizen of Great Britain, residing at Detroit, in the county of Wayne and State of Michigan, have invented a new and useful Improvement in Shifting Thill-Couplings, of which the following is a specification.

My invention relates to an improvement in shifting thill-couplings for sleighs; and it consists in the peculiar construction and combination of devices, that will be more fully set forth hereinafter, and particularly pointed out in the claims.

In the drawings, Figure 1 is a perspective view of a sleigh provided with shifting thills and couplings embodying my improvements. Fig. 2 is a top plan view of my improvements, partly in horizontal section. Fig. 3 is a transverse section taken on the line $x$ $x$ of Fig. 2. Figs. 4, 5, and 6 represent modifications of my invention.

A represents the sleigh, having the runners B, and the usual draft-bar, C, connecting the runners on the front end of the sleigh. This draft-bar is provided with screw-threaded extremities, which pass through transverse openings that are made in the runners or through irons attached to the runners at that point; and on the outer ends of the said extremities are secured nuts D.

E represents the thills, which are provided with the usual cross-bar, F, to which the whiffletree is attached, and the rear ends of the thills are provided with eyes G.

H represents a clip, which is attached to one end of the bar C and projects forwardly therefrom, and the said clip is provided at its front end with an opening, $h$.

I represents a clip, which is formed of separable sections $a$ and $b$, that are bolted together, as shown in Fig. 3; or the said sections may be secured together by being hinged at one end and provided with a clamping-bolt at the other end, as shown in Fig. 4; or it may be made in any suitable manner. Between the sections $a$ and $b$, in opposite ends of the clip I, are formed openings $c$ and $d$. The draft-bar C extends through the opening $c$. Attached to clip I is a detent-spring, K, which is secured thereto by a rivet or otherwise. The outer end of said spring is formed into a handle or thumb-hold, $l$, and is there provided with a tip or projection which is adapted to engage either of the series of openings or recesses C' that are made in the draft-bar C. A set-screw may be inserted in the clips, which would, when turned down, bear on the bar and hold the clips thereon at any point desired, thus entirely omitting the spring K; or both spring and set-screw may be used, if desired; or any other suitable means may be used that will serve to keep the clips in the desired place on the bars.

L represents a bar, which is passed through the openings $h$ and $d$ of the clips. The ends of the said bar are screw-threaded, and pass through the eyes G at the rear ends of the thills, whereby the thills are hinged to the said bar, and suitable nuts, M, are screwed onto the projecting threaded ends of the bar L, so as to keep the thills securely attached thereto. The clip I is firmly clamped to the bar L, and is thereby adapted to move with the said bar; but the latter is free to move through the opening $h$ of the clip H.

By first releasing the detent-spring from the openings or notches in the bar C with which it is engaged the thills may be adjusted laterally by sliding the clip I on the bar C and moving the bar L in the opening of the clip H, and as the series of the notches or openings C' are provided on the bar C it will be understood that the detent-spring may be caused to engage either of them, so as to secure the thills at any desired lateral adjustment, either at the center of the sleigh or upon one side thereof.

In Fig. 5 I show a modification of the clip H, in which it is formed integrally with the outer end of a brace-bar, N, with which the front end of the runners is provided.

A thill-coupling thus constructed is exceedingly cheap and simple, is strong and durable, and admits of being readily adjusted to either side or center of the sleigh.

By providing the draft-bar C with reduced threaded extremities which pass through the runners, and by clamping the front ends of the brace-rods M onto the said extremities of the bar, a very firm brace is made for the runners, thus adding materially to the strength and durability of the sleigh.

I do not desire to limit myself to the precise construction hereinbefore described, as it is evident that modifications may be made therein without departing from the spirit of my invention.

Having thus described my invention, I claim—

1. In combination with the draft-bar C, the laterally-movable bar L, to which the thills are pivoted, the clips connecting the bars C L, one of the clips being fixed on bar L and sliding loosely over bar C, and the detent carried by the movable clip in its movements, said detent engaging the draft-bar, as set forth.

2. The combination, with the draft-bar C, arranged between the runners and secured at its ends thereto, of the laterally-movable bar L, connected to bar C, and the thills journaled on bar L, as set forth.

3. The draft-bar C, secured in position, in combination with the laterally-movable bar L, clips connecting bars L C, and detents connected to and carried by the clips and engaging the bar C, as set forth.

4. The combination of the runners and the draft-bar having the threaded ends passed through the runners, thereby bracing the same, the nuts screwed onto the outer threaded ends of the runners, the laterally-movable bar L, the thills pivoted thereto, and the clips connecting the draft-bar and the bar L, substantially as described.

5. The combination of the draft-bar, the clip H secured thereto and having the opening $h$, the clip I, having the openings $d$ and $e$, and the laterally-movable rod L in the remaining openings of clip I and in the opening $h$ of clip H, and the thills hinged to the said rod, substantially as described.

6. The combination, with the draft-bar C, of the laterally-movable bar L, the thills pivoted thereto, and the hinged sectional clips connecting the bars L C together, as set forth.

In testimony that I claim the foregoing as my own I have hereto affixed my signature in presence of two witnesses.

GEORGE P. ASKIN.

Witnesses:
   EDWARD C. SCHRODER,
   WILLIAM J. WILSON.